Feb. 27, 1940.  A. C. COLLINS ET AL  2,191,847
MOLDING MACHINE
Filed Oct. 26, 1938  4 Sheets-Sheet 4
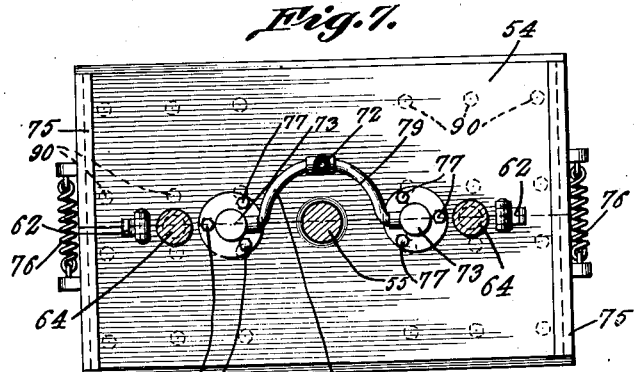
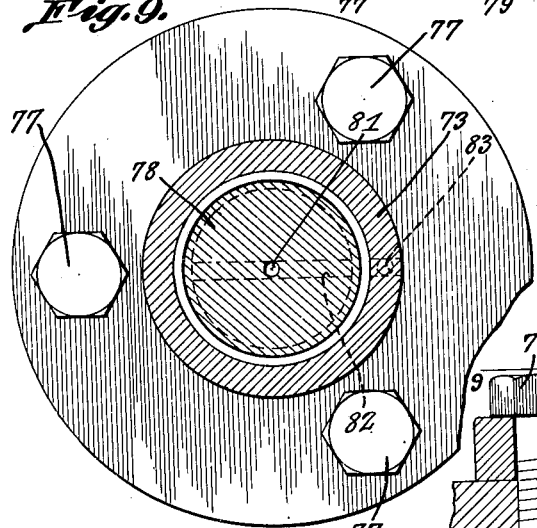
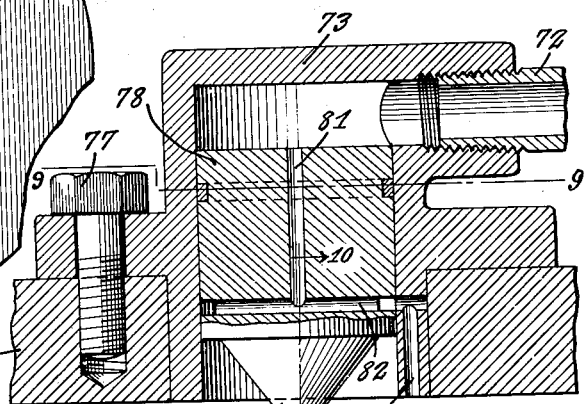
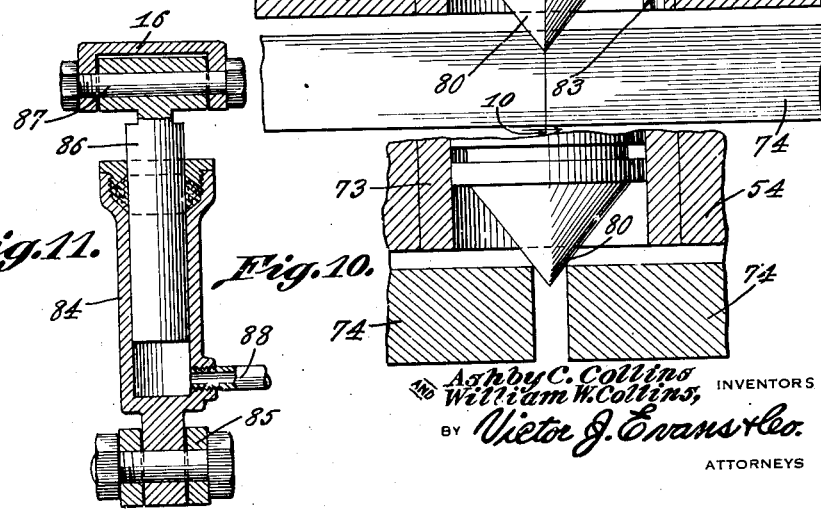
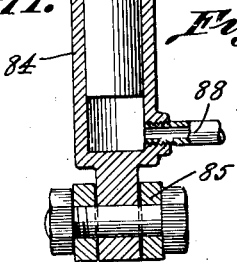

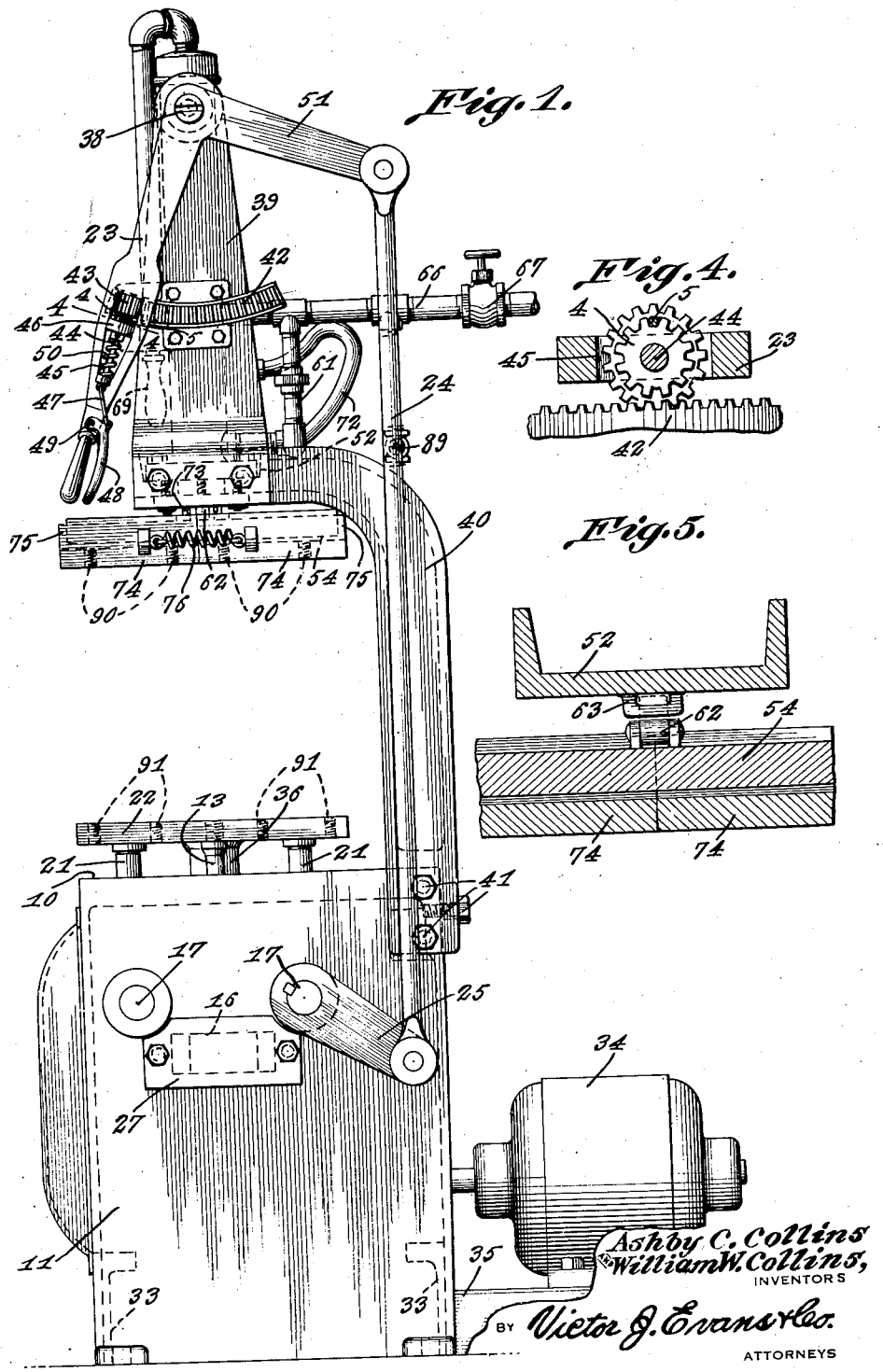

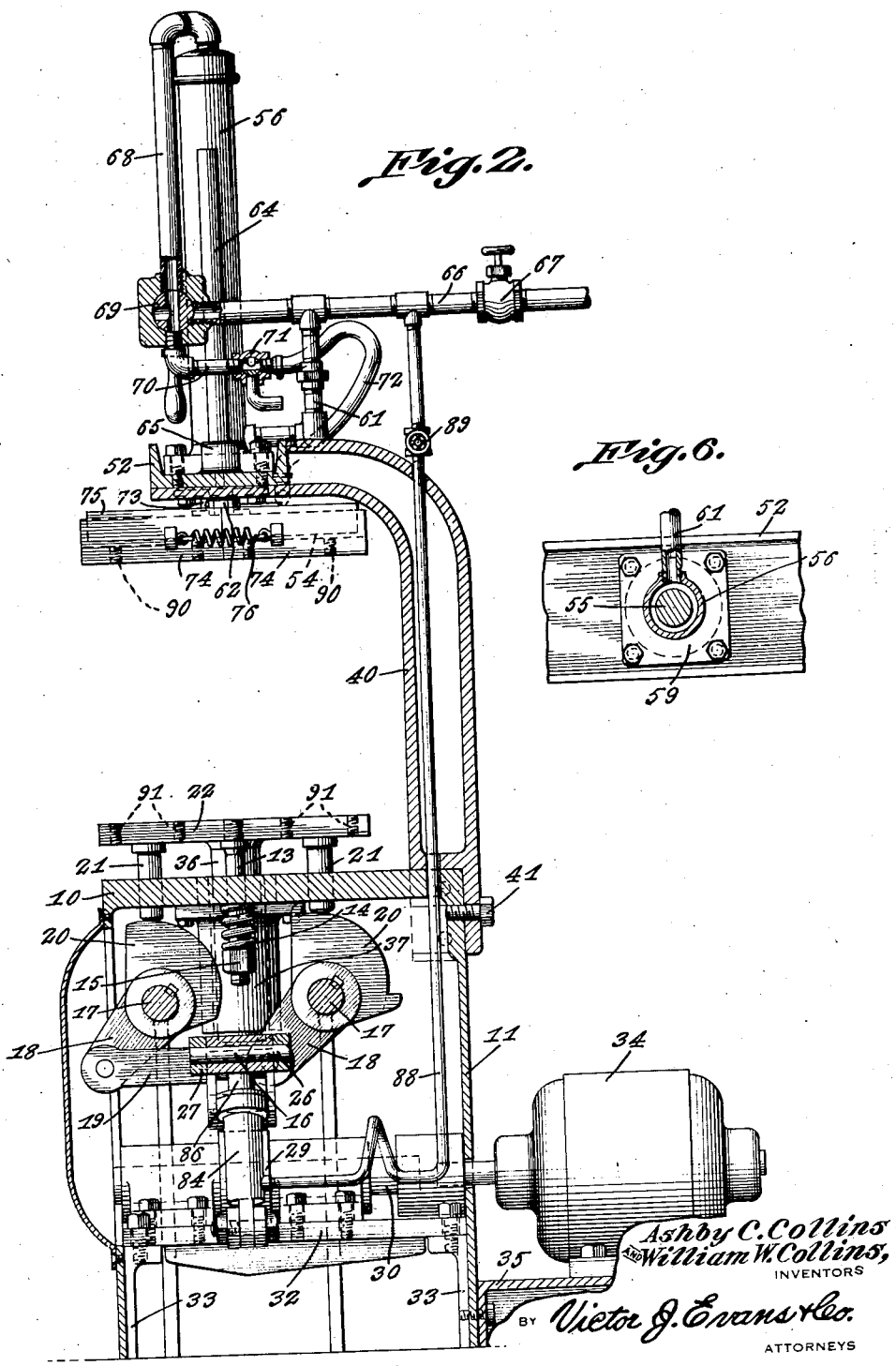

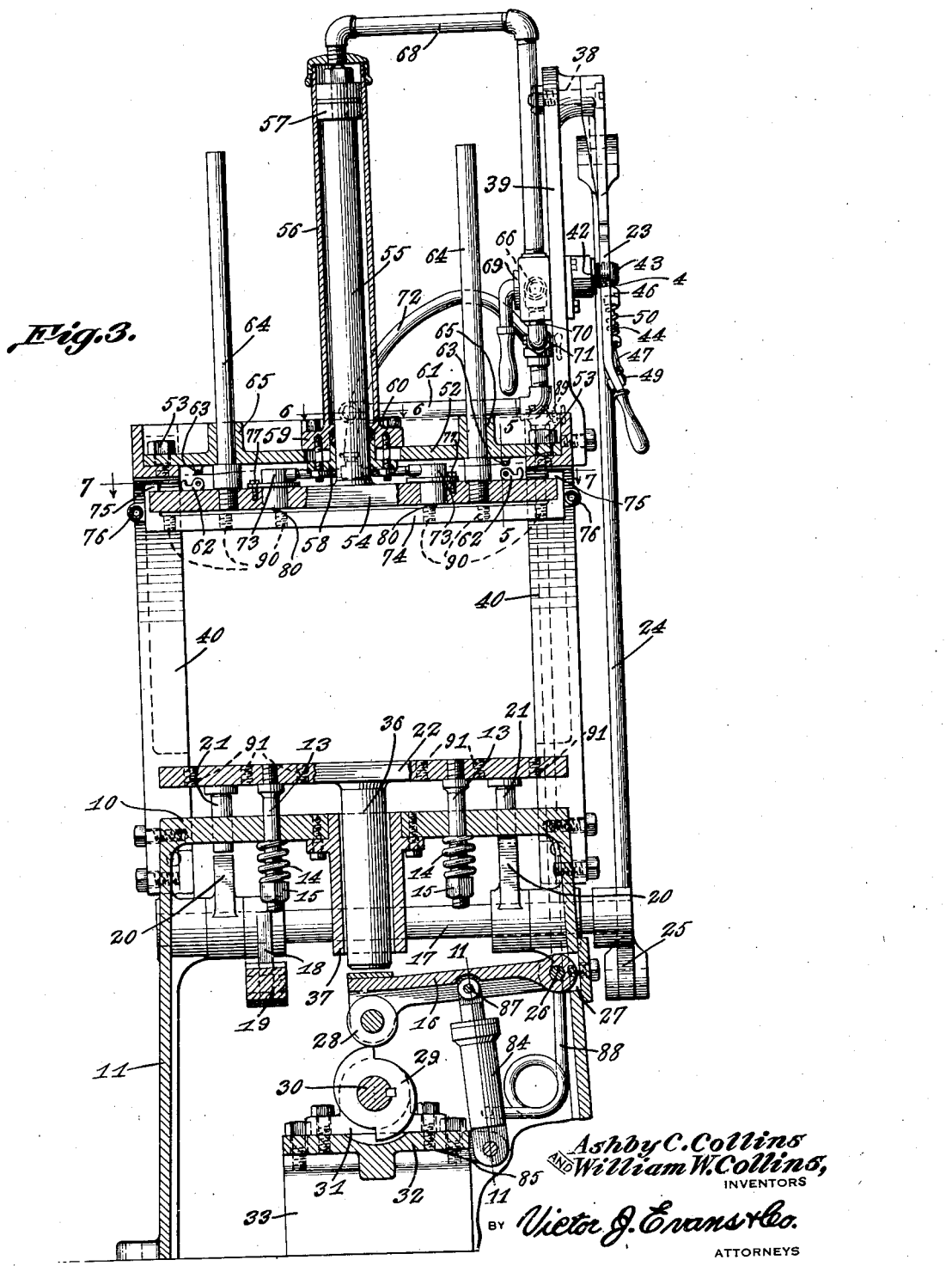

Patented Feb. 27, 1940

2,191,847

UNITED STATES PATENT OFFICE 2,191,847

MOLDING MACHINE

Ashby C. Collins and William W. Collins, Birmingham, Ala.

Application October 26, 1938, Serial No. 237,109

4 Claims. (Cl. 25—41)

This invention relates to a molding machine of the type in which molding is performed by vibration.

An object of the present invention is to provide a machine of this type in which springs, together with a striking arm and its operating means, constitute mechanism for jarring the mold table.

A further object is to provide a machine of this type in which the degree of jarring is controlled through the medium of a single lever and its connections.

A further object is to provide novel pneumatic means, for raising and holding the cap plate in raised position off of the mold and material.

A further object is to provide novel pneumatic means for breaking the cap plate loose from the material of the mold when the cap plate is to be raised off of the mold.

A further object is to provide a machine of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of a molding machine constructed in accordance with the invention.

Figure 2 is a longitudinal sectional view of the molding machine shown in Figure 1 with parts in elevation.

Figure 3 is a cross sectional view of the molding machine.

Figure 4 is a detail cross sectional view taken on the line 4—4 of Figure 1 and showing the control lever locking means.

Figure 5 is a longitudinal sectional view taken on the line 5—5 of Figure 3 and showing one of the hooks for locking the cap plate in raised position.

Figure 6 is a cross sectional view taken on the line 6—6 of Figure 3 showing the pneumatic cylinder and piston for holding the cap plate applied to the material in the mold.

Figure 7 is a cross sectional view taken on the line 7—7 of Figure 3 showing the cap plate in plan.

Figure 8 is an enlarged detail sectional view showing one of the plungers for parting the movable plates for breaking the cap plate loose from the material in the mold.

Figure 9 is a detail cross sectional view taken on the line 9—9 of Figure 8.

Figure 10 is a fragmentary sectional view of the parting plunger and movable plates taken on the line 10—10 of Figure 8.

Figure 11 is an enlarged longitudinal sectional view taken on the line 11—11 of Figure 3 showing the pneumatic cylinder and plunger for raising the mold table off of the cams.

Referring now to the drawings in which like characters of reference designate similar parts in the various views, 10 designates the bed plate of the machine, the same being supported by frame plates 11 which house the devices for vibrating the mold table 12. Bolts 13 are secured to the mold table and extend downwardly through the bed plate, and coil springs 14 are sleeved on the bolts between the plate and nuts 15 on the bolts as shown in Figure 1. The springs 14, together with the striking arm 16 and its operating means, constitute mechanism for jarring or vibrating the mold table.

A pair of horizontal shafts 17 are journaled in the frame plates below the bed plate, and are connected together by crank arms 18 fixed to the shafts, and a link 19 connected to the ends of the crank arms, as shown in Figure 2. Cams 20 are fixed to the shafts, and pins 21 are slidably engaged through vertical openings formed in the bed plate and are arranged between the cams and the underside of a mold table 22. Means, including a hand lever 23, later described, are provided for operating these shafts. Movement of the hand lever in one direction, through the medium of a link 24, and a crank arm 25, connected to one of these shafts as shown in Figure 1, turns the high sides of the cams 20 against the pins 21 to raise the mold table to high operative position with relation to the striking arm 16, and movement of the hand lever in the opposite direction lowers the mold table to lower operative position with relation to the striking arm to vary intensity of jarring.

The beforementioned striking arm 16 is pivoted on a horizontal pivot pin 26, carried by a bearing 27 which is secured to one of the frame plates. The free end of the striking arm is equipped with a depending roller 28, shown in Figure 3, which rides on a cam 29 carried by a shaft 30 which is mounted in suitable bearings 31 carried by a bracket 32 which is bolted to angle iron supports 33 carried by the frame plates as shown in Figure 2. The shaft is connected to the shaft of an electric motor 34 which is supported by a bracket 35 secured to one of the frame plates. Other driving means may be employed.

When the shaft is turned axially the cam 29 lifts the roller 28 a plurality of times during each complete revolution to impinge the arm 16 against the bottom of a vertically disposed shaft 36 which is secured to the underneath face of the mold table 12 and which is slidably fitted in a bearing sleeve 37 which depends from the bed plate 10 of the machine. The mold table is thus vibrated, the quickness of movement being increased by tension of the compression springs 14.

The mold table may be supported, together with the vertical shaft 36, at any desired operative position with relation to the striking arm 16 whereby to permit the degree of jarring imparted to the mold table to be varied. For this purpose, as shown in Figure 1 the beforementioned lever 23 is pivoted at its upper end upon a horizontally disposed pivot pin 38 mounted on the upper end of an upstanding bracket arm 39 which is secured at the lower end to the horizontally disposed upper end of one of the two channel iron columns 40 which are bolted to the frame plates as shown at 41. An arcuate rack 42, shown in Figures 4 and 1, is fixed to the bracket arm 39, concentric with the pivot pin 38 of the arm. A gear 43 is mounted on a stub shaft 44 disposed within an opening 45 formed in the lever 23 and engages the rack. A gear 4 of smaller diameter than the gear 43 is fixed to the latter and between the teeth of the small gear a pin 5 is engaged to hold the lever 23 in adjusted positions longitudinally of the rack 42. The pin is slidably fitted in a suitable bearing member 46 which is fixed to the lever 23 and is connected by a link 47 to a latch 48 which is pivoted as shown at 49 adjacent to the grip of the lever. A helical spring 50 is sleeved on the pin and normally holds the pin engaged with the small gear 4. By depressing the latch 48 the lever may be shifted to any predetermined position on the rack and when the latch is released the pin enters between teeth of the small gear 4 and holds the lever stationary.

The lever is formed integral with a crank arm 51 which is connected to the upper end of the beforementioned link 24. Thus when the lever 23 is shifted to a predetermined position on the rack 42, the crank arm 51, link 24 and crank arm 25 will position the cam shaft 17 to hold the cams 20 in a predetermined position with respect to the pins 21 to vary the space between the lower end of the vertical shaft 36 and striking arm 16 and thus control the intensity of the jarring imparted to the mold table.

By referring now to Figures 2 and 3 it will be seen that a channel beam 52 bridges the horizontally disposed ends of the columns 40 and is bolted thereto as shown at 53. A cap plate 54 is suspended from the channel beam through the medium of a plunger 55 the lower end of which is connected to the cap plate. The plunger is slidably mounted in a cylinder 56 and is equipped with a piston 57. The lower end of the cylinder is closed through the medium of a flanged cylinder head 58 which is bolted to a flange 59 on the bottom of the cylinder and is sealed airtight to the piston through the medium of a gasket 60. Air is let into the cylinder below the piston through an air pipe 61 and exerts a pressure against the piston to move the plunger to its upper limit of movement in the cylinder and normally hold the cap plate 54 raised to its upper limit of movement. A pair of hooks 62 are pivoted on the cap plate and are engaged through keepers 63 carried by the underneath face of the channel beam to lock the cap plate in raised inoperative position.

When a mold, with a plastic therein, is placed upon the mold table 12 the cap plate 54 is lowered into position on top of the mold and material therein, such movement being guided through the medium of guide pins 64 which are secured at the lower ends of the cap plate and are slidably fitted in tubular guides 65 carried by the channel beam. The cap plate acts as a tamper to tamp the plastic simultaneously with the jarring thereof to intimately fill all spaces and produce a compact article of uniform texture throughout.

Air is supplied through a main air pipe 66 which is controlled by a valve 67. The beforementioned air pipe 61 leads from this pipe to the bottom of the pneumatic cylinder 56 and a pipe 68 leads from this pipe to the top of the pneumatic cylinder.

A two-way valve 69 establishes communication between the pipe 68 and the supply pipe 66 and also with a pipe 70 which is equipped with a two-way valve 71 adapted to vent air from the top of the cylinder when in one position. When the valve 71 is turned in the other position it establishes communication between the pipe 70 and a pipe 72 which enters a piston cylinder 73, best shown in Figure 8, for assisting in the breaking loose of the top plate from the clay or other material in the mold as will now be described.

A pair of plates 74, best shown in Figures 1, 2, 3 and 7 are slidably mounted on the bottom face of the top plate 54 and provided with respective flanges 75 which hook over the edges of the top plate and guide sliding movement of the plates 74 toward and away from each other. The plates are normally held in abutting relationship through the medium of helical springs 76 which bridge the plates and are secured at the ends to the plates.

The plates 74 are adapted to contact the plastic in the mold during the jarring operation and must be broken loose from the material when the molded article is completed, and to accomplish this a pair of the piston chambers 73, above mentioned, are secured to the top plate 54 as best shown in Figures 7 and 8, through the medium of bolts 77. The upper ends of the chambers, above the piston 78, are connected to the pipe 72 through the medium of branch pipes 79 for the purpose of letting air into the cylinders above the pistons. Each piston is provided with a conical lower end 80 which is adapted to engage between both sliding plates 74, as best shown in Figure 10, and when air is let into the cylinders above the pistons to move the pistons downwardly, these conical ends pry the sliding plates 74 apart and break them loose from the material of the mold.

Each piston 78 is provided with an axial bleed pipe 81 which communicates with a transversely disposed bleed pipe 82 which in turn communicates with a bleed passage 83 in the wall of the cylinder. The purpose of these bleed passages is to partly exhaust air therethrough from above the piston and cylinder 56, the pressure in said cylinder being great enough to move the parting pistons 78 downward to cause the sliding plates 77 to be parted as the cap plate rises to the top of the machine.

In order to relieve the lever 23 and its connections of the strains of holding the mold table 12 in raised position out of operative connection with the cam 29 shown in Figure 1, an auxiliary air cylinder 84 is shown best in Figure 11. The air cylinder is pivoted at the lower end upon a lug 85 carried by the bracket 32. A piston 86 is slidably mounted in the cylinder and is pivotally connected at the upper end to the striking arm 16 as shown at 87. An air pipe 88 communicates with the cylinder below the piston and communicates with the air supply pipe 66. A valve 89, best shown in Figure 2, controls flow of air through the pipe 88, to the cylinder. When the valve 89 is opened air enters the cylinder 84 underneath the piston and elevates the piston to raise the striking arm 16 into contact with the vertical shaft 36 of the mould table 12 and out of engagement with the cam 29 thus stopping vibratory movement of the mold table. A plurality of openings 90 are formed in the sliding plates 74 and a plurality of openings 91 are formed in the mold table. The purpose of these openings is to attach guides or forming plates as the case may be.

In operation with the control lever set for any desired position to produce a predetermined intensity of vibration, and assuming that the control valve 92 of the air supply pipe is open, the motor 34 is started. The mold with the material therein is placed on the mold table 12 which is held off of the cam 29 by the raised auxiliary piston 86 and striker arm 16. Air is admitted to the top of the cylinder 56 by opening the air valve 69 causing the cap plate 54 to be forced down on to the material of the mold.

The pressure in the cylinder 56 is great enough to overcome the constant pressure in the lower end of the cylinder and also the constant pressure exerted on the mold table 12 by the auxiliary piston 86. The pressure in the top of the cylinder 56 forces the cap plate, mold, mold table, vertical shaft 36 and striker arm 16 down against the cam 29 thus causing vibration to start and tamp the material into the mold.

In order to remove the mold from the material the air control valve 69 is returned to its original position thus causing the air in the upper end of the cylinder 56 to be admitted to the parting pistons 78 through the pipe 72. A small amount of air is exhausted through the air passages 81, 82 and 83 into the atmosphere thus causing the mold table to raise off of the cam 29. Due to the air passages 81, 82 and 83 being small, the pressure in the cylinder 56 against the top of the piston 57 is great enough to move the parting pistons 78 downward, thus causing the sliding plates 74 to be parted at the same time the cap plate 54 leaves the mold and rises to the top of the machine. As the cap plate moves upward, the auxiliary piston 86 lifts the mold table off of the cam 29 thus stopping vibration.

From the above description it is thought that the construction and operation of the invention will be fully understood without further explanation.

What is claimed is:

1. A molding machine including a frame, a base plate extending horizontally from the frame, a mold table above the base plate, a striking arm pivoted to the frame below the base plate, a power driven cam adapted to rock the striking arm in a vertical plane, a shaft depending from the mold table and slidably projecting through the base plate into the path of movement of the striking arm for vibrating the mold table, horizontally disposed shafts mounted on the frame below the base plate, cams fixed to the shafts, pins slidably mounted in the base plate and adapted to engage the cams and the underside of the mold table, a lever carried by the frame and connected to the shafts for setting the cams in a predetermined position to control the degree of vibration of the mold table, columns extending above said frame and terminating in horizontally disposed upper ends overhanging the mold table, a cap plate suspended from said upper ends of the columns, pneumatic means for holding said cap plate in position to tamp material during the vibratory moulding thereof by the mold table, spring pressed plates disposed upon the bottom face of the cap plate and adapted to contact the material being molded, and pneumatic means for prying said sliding plates away from each other to break the cap plate away from the material being molded.

2. A molding machine including a frame, a base plate extending horizontally from the frame, a mold table above the base plate, a striking arm pivoted to the frame below the base plate, a power driven cam adapted to rock the striking arm in a vertical plane, a shaft depending from the mold table and slidably projecting through the base plate into the path of movement of the striking arm for vibrating the mold table, horizontally disposed shafts mounted on the frame below the base plate, cams fixed to the shafts, pins slidably mounted in the base plate and adapted to engage the cams and the underside of the mold table, a lever carried by the frame and connected to the shafts for setting the cams in a predetermined position to control the degree of vibration of the mold table, a cap plate mounted on said frame to move vertically toward and away from the mold table, a pneumatic cylinder and piston therein connected to the cap plate for raising and lowering the cap plate, means for supplying air on top of the piston to lower the cap plate into operative engagement with material being molded, spring controlled plates slidably mounted on the bottom face of the cap plate and adapted to engage the material being molded, and pneumatic cylinders with conical shaped plungers therein connected to the cap plate and adapted to pry said sliding plates loose from the molding material.

3. A molding machine including a frame, a mold table, means for vibrating the mold table, a cap plate suspended over mold table, pneumatic means for holding said cap plate in position above the mold table, plates slidably disposed upon the bottom face of the cap plate and adapted to contact material being molded, and pneumatic means for sliding said plates laterally away from each other to break the cap plate away from the material being molded.

4. A molding machine including a frame, a mold table, means for vibrating the mold table, a cap plate mounted on said frame to move vertically toward and away from the mold table, plates slidably mounted on the bottom face of the cap plate and adapted to engage material being molded, and a pneumatic cylinder and plunger therein connected to the cap plate and adapted to slide the plates laterally away from each other to break the cap plate loose from the material being molded.

ASHBY C. COLLINS.
WILLIAM W. COLLINS.